United States Patent [19]

Cummings et al.

[11] Patent Number: 4,590,585
[45] Date of Patent: May 20, 1986

[54] CHARACTER GENERATOR FOR RASTER PRINTER

[75] Inventors: Kenneth D. Cummings; Donald R. Gould; Forrest C. Gray, all of Tucson, Ariz.; Lawrence W. Pereira, San Jose, Calif.

[73] Assignee: International Business Machines, Armonk, N.Y.

[21] Appl. No.: 407,967

[22] Filed: Aug. 13, 1982

[51] Int. Cl.⁴ .............................................. G06F 3/12
[52] U.S. Cl. ...................................... 364/900; 364/518
[58] Field of Search ... 364/200 MS File, 900 MS File, 364/518, 523

[56] References Cited

U.S. PATENT DOCUMENTS

| 4,000,486 | 12/1976 | Schomburg | 364/200 |
| 4,031,519 | 6/1977 | Findley | 364/900 |
| 4,070,710 | 1/1978 | Sukonick et al. | 364/900 |
| 4,079,458 | 3/1978 | Rider et al. | 364/900 |
| 4,298,931 | 11/1981 | Tachiuchi et al. | 364/200 |
| 4,300,206 | 11/1981 | Belleson et al. | 364/900 |

Primary Examiner—Gareth D. Shaw
Assistant Examiner—Daniel K. Dorsey
Attorney, Agent, or Firm—Otto Schmid, Jr.

[57] ABSTRACT

A character generator for a raster printer which prints in the page mode. Input format data is generated in response to the input print data which defines for each pattern the position of the pattern on the page, the size of the pattern and the location of the pattern in the raster pattern storage. The format data is accessed for all patterns beginning within a predetermined plurality of scan lines and raster data is accessed in response to the format data to store in an output buffer the raster pattern data in the sequence, size and position defined by the format data. The raster pattern data can then be accessed to control a printer to print on a print medium a pattern defined by the input print data.

18 Claims, 17 Drawing Figures

FORMAT 04:

HEADER: 3 Bytes, program I/O

```
                |------ 6 --------|--- 2 ---|
                |-----------------|---------|
Byte 0:         | 0 0 0 0 0 0     | S U B - |
                |                 | S C A N |
                |-----------------|---------|
                | S T A R T I N G   S C A N |
                |----------------------------|

|-2--|---- 6 ----|1-|-2 -|---- 5 ---|
                |----|-----------|--|----|----------|
Bytes 1-2:      |0 0 |    Y P    |* |0 0 |    X P   |  *=1 for 16 PEL
                |----|-----------|--|----|----------|    0 for 32 PEL Y P = Y Dimension of Char in number of Scans - 1
                X P = X Dimension of Char in number of 32 PELS - 1
```

ENTRY: 4-Bytes/entry, cycle steal

```
                |-- 4 ---|----------- 12 -------------|
                |--------|----------------------------|
Bytes 0-1:      |0 0 1 0 | S T A R T I N G    P E L   |
                |--------|----------------------------|

|--------------- 16 ----------------|
                |-----------------------------------|
Bytes 2-3:      | R P S    A D D R ,  8-BYTE BOUNDARY|
                |-----------------------------------|
```

TERMINATOR: 2 Bytes Long

```
                |-- 4 ---|----------- 12 -------------|
                |--------|----------------------------|
Bytes 0-1:      |0 0 0 1 | 0 0 0 0 0 0 0 0 0 0 0 0   |
                |--------|----------------------------|
```

FIG. 5

FORMAT 02:
HEADER: 1 BYTE, PROGRAM I/O
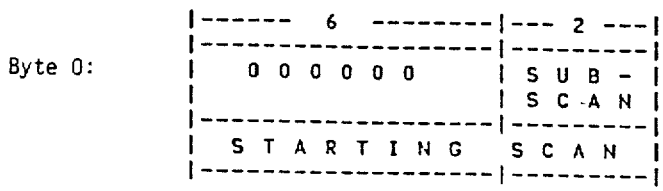
Byte 0:
ENTRY: 6 bytes/entry, cycle steal
Bytes 0-1:
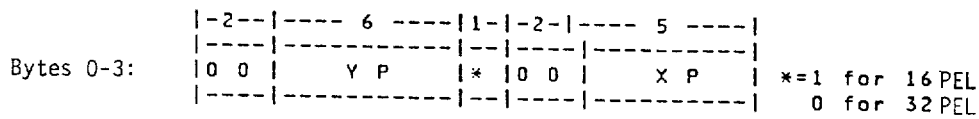
Bytes 0-3:     *=1 for 16 PEL
               0 for 32 PEL
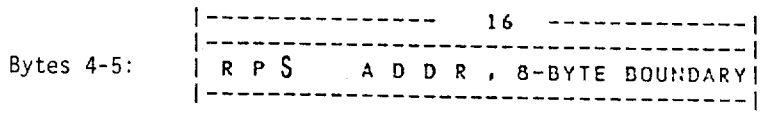
Bytes 4-5:
```
Y P = Y Dimension of Char in number of scans - 1
X P = X Dimension of Char in number of 32 PELS -1
```
TERMINATOR: 2 Bytes Long
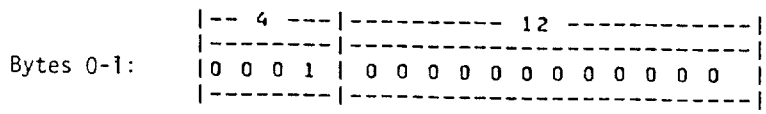
Bytes 0-1:
FIG. 6

FORMAT 2:

ENTRY: 8 Bytes/entry, cycle-steal

```
               |-- 4 ---|----------- 12 -------------|
               |--------|----------------------------|
Bytes 0-1:     |0 0 1 0 | S T A R T I N G   P E L    |
               |--------|----------------------------|

|-2--|---- 6 ----|1-|-2 -|---- 5 ---|
               |----|-----------|--|----|----------|
Bytes 2-3:     |SUB-|    Y P    |* |0 0 |   X P    |     *=1 for 16 PEL
               |SCAN|           |  |    |          |        0 for 32 PEL
               |----|-----------|--|----|----------|

|--------------- 16 ---------------|
               |----------------------------------|
Bytes 4-5:     | R P S    A D D R , 8-BYTE BOUNDARY|
               |----------------------------------|

|--------------- 16 ---------------|
               |----------------------------------|
Bytes 6-7:     | SCAN TABLE BRANCH / CHAR TABLE BR |
               |----------------------------------|
```

Y P = Y Dimension of char in number of scans - 1
X P = X Dimension of char in number of 32 PELs - 1

FIG. 7

FORMAT E:

ENTRY: Kanji printing 8-Byte/Entry, Cycle Steal

Bytes 0-1:
```
|--- 4 ---|------------- 12 -------------|
|1 1 1 0  |       S T A R T I N G  P E L |
```

Bytes 2-3:
```
|-2-|--- 6 ---|-- 3 --|-2-|--- 3 ---|
|SUB-|  Y P' | X P' |0 0| E G S    |
|SCAN|       |      |   | E X T.   |
```

Bytes 4-5:
```
|------------------ 16 ------------------|
|   E G S  A D D R ,  8-BYTE BOUNDARY    |
```

Bytes 6-7:
```
|------------------ 16 ------------------|
|   SCAN TABLE BRANCH / CHAR TABLE BR    |
```

YP' = Y Dimension of Kanji in number of Scans - 1
XP' = X Dimension of Kanji in number of Bytes - 1

NOTE: The high order bit of XP' = 1 for Crab Walk of 2 (64 Pel Char)
                              = 0 for Crab Walk of 1 (32 Pel Char)

FIG. 8

CHARACTER GENERATOR FOR RASTER PRINTER

BACKGROUND OF THE INVENTION

1. Field of Invention

The present invention relates to a character generator for a page mode printing system.

2. Description of the Prior Art

Printing systems of the raster scan type have been utilized for a number of years, and these systems have generally been available in various speed ranges. These printers have generally had the capability of printing with one character set on line and in only one orientation per job.

One printer described in commonly assigned U.S. Pat. No. 4,031,519 to Findley utilized electrophotographic printing technology and was capable of accessing a variety of different character sets which were program alterable so that a very flexible line printing system was provided which was capable of operating at high printing rates.

A printer showing still greater versatility in arrangement of data to be printed is described in commonly assigned U.S. Pat. No. 4,300,206 to Belleson et al. The Belleson et al system is capable of printing both text and image data in any orientation on the page.

SUMMARY OF THE INVENTION

It is, therefore, the principal object of this invention to provide a character generator capable of producing a page for printing having unlimited flexibility in the pattern to be printed.

The present invention provides a character generator for a raster printing comprising pattern storage means for storing raster pattern data for each of the text or image patterns it is desired to print. Format data is provided by an input means in response to the input print data and the format data specifies for each pattern the position of the pattern on the page, the size of the pattern and the location of the pattern in the pattern storage means. The format data is accessed for those patterns beginning within a predetermined plurality of scan lines, and in response to the format location data, the raster pattern is read out from the pattern storage means. An output buffer means receives the raster pattern data in locations determined in response to the format location and size data. The raster data is accessed from the output buffer in the order required for printing so that a printed pattern corresponding to the pattern defined by the format data can be printed on a print medium.

BRIEF DESCRIPTION OF THE DRAWINGS

FIG. 5 is a diagram showing the format of control data for an X format with a four byte entry per character;

FIG. 6 is a diagram showing the format of control data for an X format with a six byte entry per character;

FIG. 7 is a diagram showing the format of control data for a Y format with an eight byte entry per character;

FIG. 8 is a diagram showing the format of control data for extended graphic data with an eight byte entry per raster pattern;

DESCRIPTION OF THE PREFERRED EMBODIMENT

Figure 1:
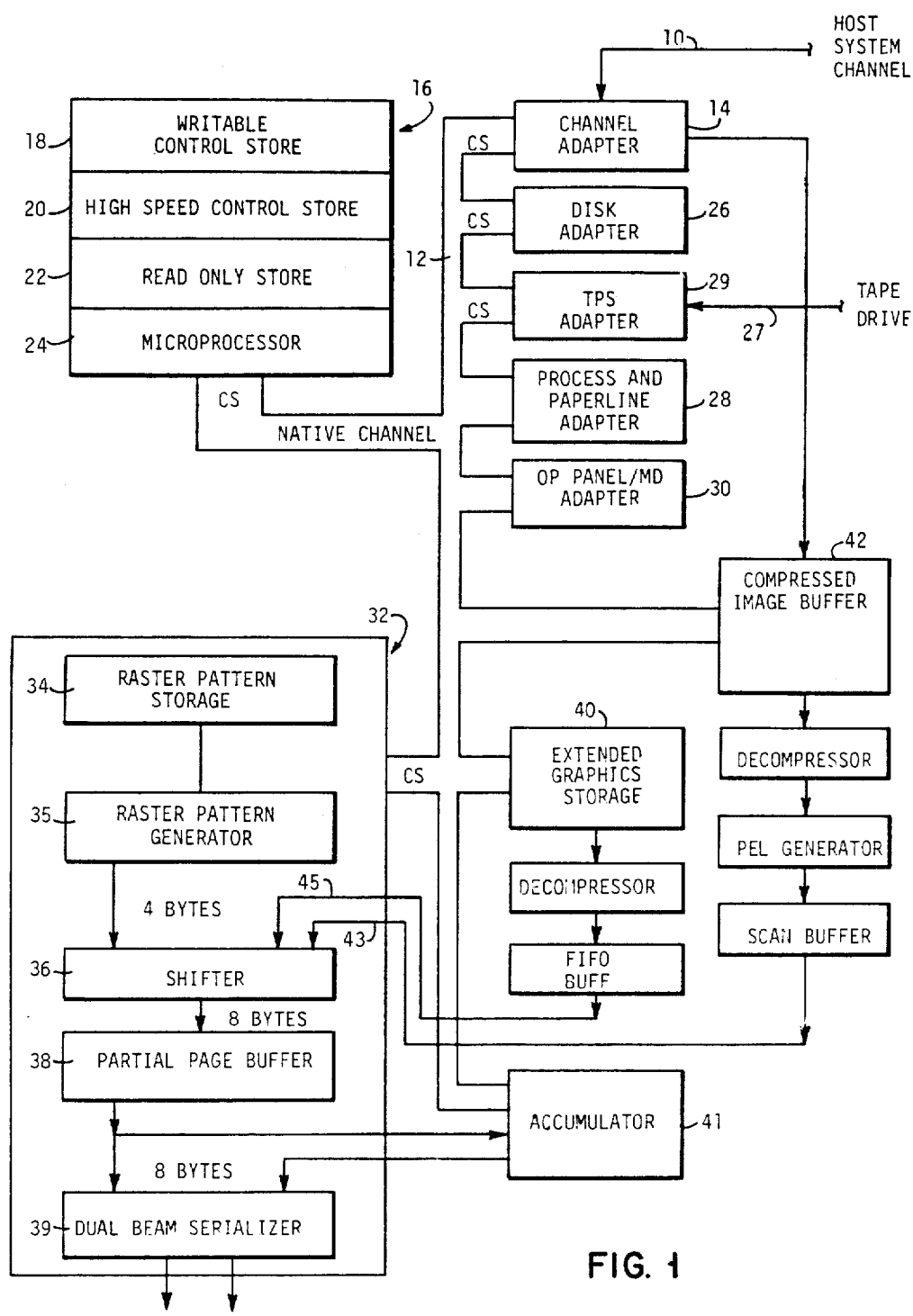
FIG. 1 is a block diagram of the basic components and the data flow of a printer available for using a character generator according to the invention.

FIG. 1 illustrates a printer which is normally operated on line with a data processing system. The general operation of the data processing system in conjunction with the printer may be as described in IBM System/370 Principles of Operation, form GA 22-700, published by International Business Machines Corporation. As described in that publication, the data processing unit, which typically includes a central processing unit and a main store, communicates with a printer and other input/output devices via the main channel 10. Character code bytes, each of which represents a different character or image to be printed by the printer, are originated in the data processing unit and are communicated to the printer under control of a channel command word sent to the main channel 10. Some control data is also included with the character data. Other channel command words originating in the data processing unit include certain instructions for the operation of the printer.

The character generator comprising the invention will be described in connection with the printer described in the above-identified Belleson et al patent, although it will be recognized by those skilled in the art that the invention is not so limited. The basic arrangement of the printer is shown in FIG. 1 and includes a native channel 12 which is coupled via a channel adapter 14 to host system channel 10, thereby providing appropriate interface between the host system channel 10 and the printer. Data from the host system is communicated over the main channel 10 to the channel adapter 14 where it is carried by the native channel 12 to control means 16. Control means 16 comprises an appropriate writable control store (WCS) 18, a high speed control store 20, a read only store 22, and a microprocessor 24.

The microprocessor 24 controls storing of data from the host system and executes the instructions provided by the various microroutines of the microprogram loaded by the printer's user from disk storage device 26. If desired, print data and associated control data may be received from a tape drive over bus 27 through Tape Adapter 29. The printer is controlled by the microprocessor by the use of the native channel as the interface for controlling the devices associated with it, and these devices include the channel adapter 14 to the host system. The process and paperline adapter 28 is the interface to the imaging means, and the microprocessor controls the printing through this interface. The adapter 28 provides control of the paper, signals for starting of the printing process, and it alerts the microprocessor relative to the status signals from the imaging apparatus. In addition, the adapter transfers to the microprocessor, signals representing all actions that occur at the operator's panel and passes back to the adapter 30, signals to control the appropriate lights on the control panel.

Figure 2:
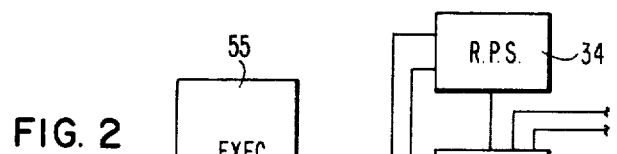
FIG. 2 is a block diagram of the basic components of the character generator according to the invention.

The character generator (C GEN) 32 creates the page being printed. The microprocessor 24 interprets the control signals and the pattern data passed from the host system and prepares the page for printing, as will be described below. As shown in FIGS. 1 and 2, the pattern data used during printing is held in the Raster Pattern Storage (RPS) 34 which must have been loaded by the microprocessor 24 before printing can take place. The disk storage device 26 is used for the initial microprogram load operation and also for storage of diagnostic programs and error logs, and it may also contain font data which is loaded into the RPS 34 for printing. The microprocessor 24 controls all seeks and data flow in the disk storage device 26.

The data to be printed is transferred in sequence from RPS 34 under control of the Raster Pattern Generator (RPG) 35 which addresses RPS 34, controls the size of the characters and/or images (width and height) to be printed and gates the data to pattern shifter 36. Pattern shifter 36 properly positions the raster pattern data relative to the word structure of the partial page buffer (PPB) 38. The data is then printed from the partial page buffer 38 by gating the composed data to a serializer 39 which supplies the data to the imaging apparatus in the proper sequence for printing. If desired, the data from PPB 38 can be logically ORed with the data from accumulator 41 while printing, as is described in the Belleson et al patent.

The character generator 32 can also accept data on data bus 41 from Extended Graphic Storage (EGS) 40 where more complex character data can be stored such as Kanji characters, for example. Image data can also be printed from the compressed image buffer 42 through data bus 43 to the character generator.

Figure 3:
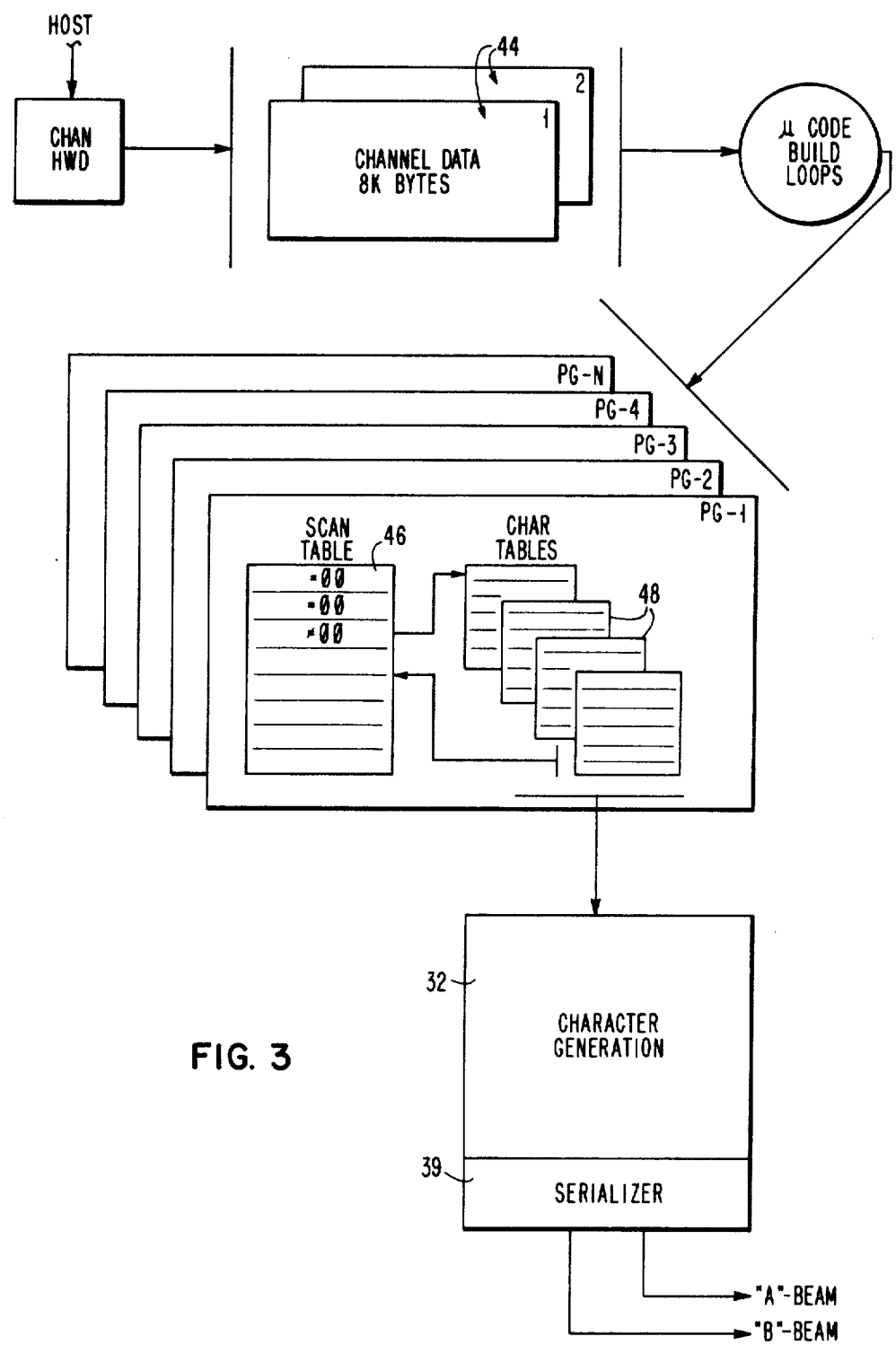
FIG. 3 is a diagram illustrating the manner in which pattern data to be printed is formatted and processed and presented to the character generator of the printer.

The signals specifying the data to be printed are provided by a suitable input means. An example of a specific embodiment of printing with our improved character generator will now be given by using as input, character data of the type processed for printing in the Belleson et al patent. In the Belleson et al patent, data comes from the host system channel through the channel adapter 14 hardware to channel data buffers 44 (FIG. 3). By using the microcode build loop as described in the Belleson et al patent, the microcode builds, in Writeable Control Store (WCS) 18, control information required for each page by using link lists (FIG. 3). The first list, called the Scan Table 46, has one entry for every predetermined group of scan lines on a page. This entry will either point to the next entry in the scan table or to a second group of link lists called the character tables. The character table contains an entry for each character, image or raster data to be printed.

The scan table 46 indicates those one or more characters, images or raster data the first scan line of which is within the predetermined group of scan lins on a page. The character table 48 indicates the attributes of each and every character, image, or raster data that is to be printed. These attributes include:
1. Horizontal position (starting pel) on the page.
2. Character or image size.
   Height in Yp
   Width in Xp
3. Character or image location in RPS.

Character entries that begin within the predetermined group of scan lines can be chained together in the same character table. The character generator can then process up to an entire print pattern with no microprocessor intervention, as will be described in detail below.

Character tables 48 that are built by microcode in WCS 43 can be generated in several different formats to improve performance and to converse storage space. For example, if numerous characters or images begin on the same group of scan lines, the character table entries can be chained together in one character table 48 and transferred (in a cycle steal mode) to the character generator 32 with only one interrupt to microprocessor 24 required at the end of the chain. In addition, character tables can be chained together for additional performance gains, and in this case, only one microcode interrupt is required at the end of each table. Minimum microcode intervention is required and performance is maximized.

Figure 4:
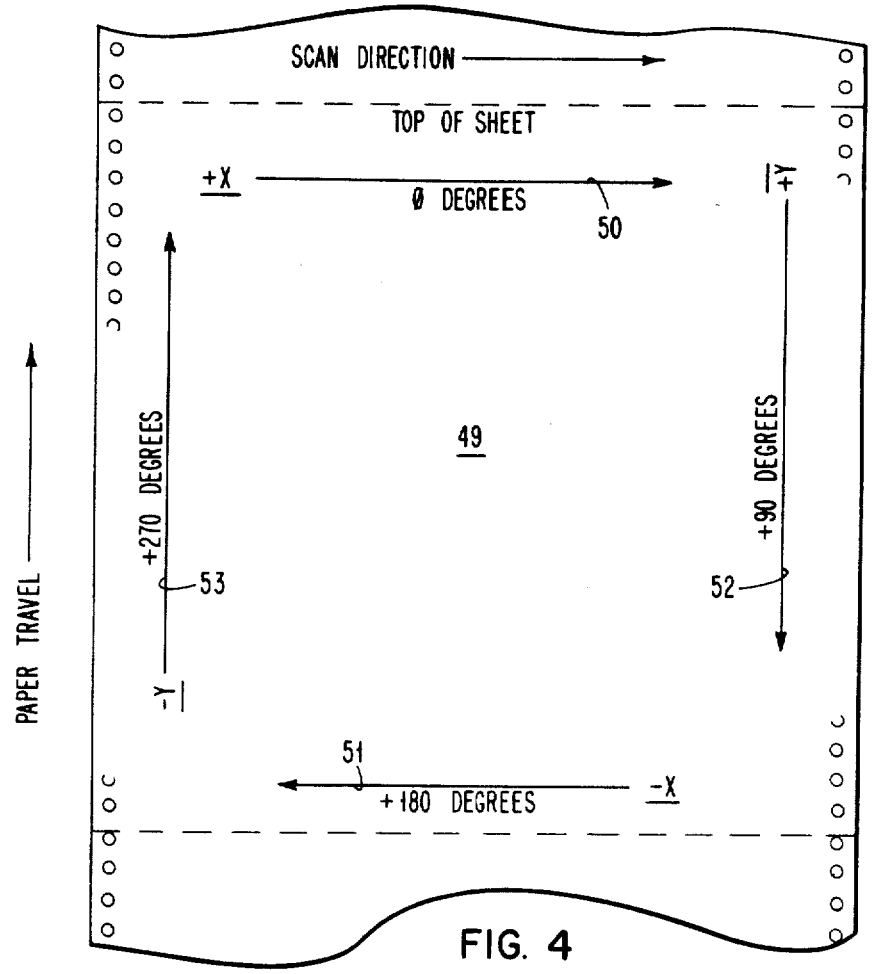
FIG. 4 is a diagram showing the different print orientation formats possible with the character generator according to the invention.

The format used in building character tables is dependent on the printing direction. As shown in FIG. 4, +X printing is defined as printing in a direction zero degrees relative to the top of the print sheet as indicated by arrow 50. −X printing is defined as printing in a direction that is +180 degrees relative to the top of the print sheet as indicated by the arrow 51. Character tables for printing in the +X or −X direction can be generated where each table entry is either 4 or 6 bytes.

+Y printing is defined as printing in a direction +90 degrees relative to the top of the print sheet as shown by arrow 52. −Y printing is defined as printing in the direction +270 degrees relative to the top of the print sheet as shown by arrow 53. When printing in the +Y or −Y direction, characters are received from the host in an order that positions each succeeding character on the same print line in a new vertical location in the partial page buffer 38. As the character is being built, i.e., each character received results in a new character table entry adjacent (in storage) to the one received prior to the new character, there must be some way to link character table entries that will lie on the same scan line. The linkage described is provided by an additional 2 bytes called the branch/link address. Therefore, every character table entry for +Y or −Y printing is 8 bytes and must contain a branch/link address to the next character table entry that is on the same scan line which is never the next entry in the character table.

The format data required for a specific embodiment of a printer constructed along the lines of the printing system described in the Belleson et al patent will now be described. There are two categories of Formats that are used. The first category of Formats is summarized in Table 1.

TABLE 1

| CATEGORY I | |
|---|---|
| Print Direction | +x or −x |
| Character Formats | 4 Formats |
| C.S. Execution | 4 or 6 Byte Cycle Steal |
| PIO Execution | Format-8 |
| Header | All Formats |
| Terminator | All Formats Except Format-8 |
| FORMATS | ATTRIBUTES |
| 2 | +x or −x, any size Latin, Variable Char INCR & Box, 6-Byte Cycle Steal Execution |
| 4 | +x or −x, Small Latin, Variable Char Incr, Fixed Box, 4-Byte Cycle Steal Execution |
| 8 | +x or −x, Small Latin, Fixed Char Incr, Variable Space = Char Incr, Inter Char Incr = 0, PIO-Execution |
| E | +x or −x, Kanji, any size = <64 × 64, Fixed Char Incr & Box, 6-Byte Cycle Steal Execution |

The Category I, Format 4 entries are shown in FIG. 5. This Format is used for processing raster data in the ±X direction in which the box size is the same for each of the characters or images within that character table. The size information is given in the header or at the start of the page, so for this format, each character table entry need only be 4 bytes long and a 4 byte cycle steal mode may be used. The header information is accessed one byte at a time in response to PROGRAM I/O Instructions from microprocessor 24. The first header byte contains the starting scan data. Note that a 2-bit field, SUB-SCAN is included. For this specific embodiment, the predetermined group of scan lines is four. The SUB-SCAN field is decoded to determine on which of the 4 scan lines within the group the raster image starts. The second and third bytes of header data include the size data which, in this Format, is the same for all raster images. Yp gives the dimension in scan lines −1, and Xp gives the dimension in the number of 32 pel entries −1. Once the header data is accessed, stored and decoded, the accessing of the character table entries is begun. The data is accessed 2 bytes at a time in a cycle steal mode. As shown in FIG. 5, the first two bytes 0–1 include a control field of 4 bits and the starting pel address. The second cycle steal accesses bytes 2 and 3, and these bytes form the RPS address for the designated raster pattern. The Terminator is a two byte embedded control which is the last entry of each character table in this format.

The Category 1, Format 2 entries are shown in FIG. 6. This format is used for processing raster data in the ±X direction in which the raster images to be printed vary in size. In this case, the Header data includes only the starting scan information, and each character table entry is 6 bytes long. Bytes 0–1 are the same as Format 4, but Bytes 2–3 include the size data for each raster pattern and Bytes 4–5 indicate the RPS address for the raster pattern data. The Terminator is the same as for Format 4.

The remaining Formats in Category I will not be described in detail. Format 8 is used in case there are only a few discrete characters placed randomly on the page. In this case, the Format data is loaded directly with Program I/O Instructions from microprocessor 24. For this mode of operation, a microcode interrupt will occur after the insertion of each raster pattern into the PPB 38.

Format E is used for printing Extended Graphics data such as Kanji. In this Format, the starting scan is accessed in the header data, and a 6-byte cycle steal is utilized for each table entry. Bytes 0–1 comprise a control field and the starting pel address, Bytes 2–3 include the size data, and Bytes 4–5 include the EGS address for the raster pattern.

The Category II Formats are summarized in Table 2.

TABLE 2

| CATEGORY II | |
|---|---|
| Print Direction | ″Y |
| Character Formats | 5 Formats |
| C.S. Execution | 8 Byte Cycle Steal |
| PIO Execution | None |
| Header | None |
| Terminators | None |
| Linkage | Branch/Line Address |
| FORMATS | ATTRIBUTES |
| 2 | +Y, −Y, any size Latin, fixed or variable char incr & box, 8-Byte cycle steal execution |
| 4 | Image, 8-Byte cycle steal execution |
| 8 | Rules, 8-Byte cycle steal execution |
| C | Image to be double dotted, 8-Byte cycle steal execution |
| E | +Y, −Y, Kanji, any size = <64 × 64, fixed char incr & box |

The Category II, Format 2 entries are shown in FIG. 7. This Format is used for processing raster data in the ±Y direction. Note that no header information is used in the Format, and an 8 byte entry is included for each character. The first two bytes 0–1 of data include the control field and the starting pel address, and bytes 2–3 include the size data. Bytes 4–5 contain the RPS address data, and Bytes 6–7 comprise the Branch/Link Address field.

As shown in FIG. 8, the Category II, Format E data also includes 8 bytes, and this Format is used for printing Extended Graphics data such as Kanji. Bytes 0–1 include the control field and the starting pel, and Bytes 2–3 include the size data. In this Format, Yp' is the Y dimension in the number of scans −1, and Xp' is the X dimension in the number of bytes −1. Bytes 4–5 contain the EGS address of the raster pattern and Bytes 6–7 give the Branch Link Address.

Figure 9:
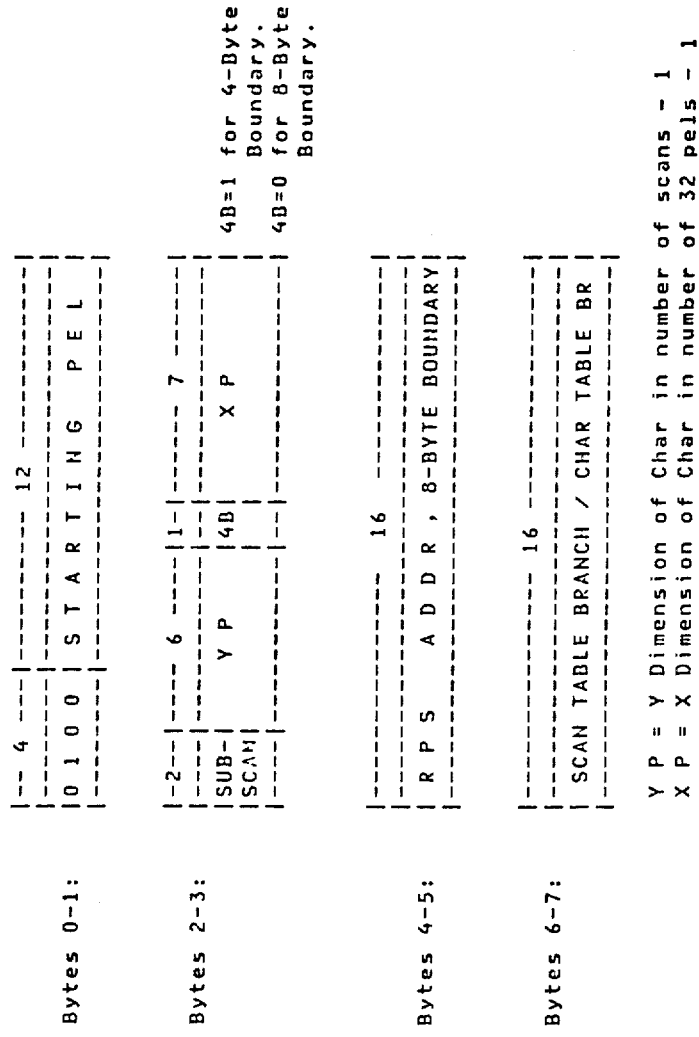
FIG. 9 is a diagram showing the format of control data for image data with an eight byte entry per image segment.

The Category II, Format 4 is used for printing image data, and this Format is shown in FIG. 9. Format 4 has 8 bytes per table entry, and the first two bytes 0–1 include a control field and the starting pel field. Bytes 2–3 include the size data, and bytes 4–5 include the RPS address of the image data. Bytes 6–7 contain the Branch/Link Address field.

The Category II Formats also include provision for printing Rules and Double-Dotted images. The Rules are straight lines of a chosen width. The Rules fonts are stored for n different values of line width with increments starting at one pel and increasing one pel for each entry until an entry of n pels is included. In this case, it is necessary to include the RPS address for the segment of the desired number of pels. The RPS address does not increment during the printing of Rules since the same segment is printed each scan line. Consequently, the RPS can be used for other purposes, such as loading a new raster pattern during a Rules printing operation.

Examples have now been given of specific embodiments of Formats for both X and Y printing, both X and Y extended graphics data printing, printing image data, and for printing Rules. These examples show the variety of data that can be printed by the use of our improved character generator.

The format data controls the operation of the character generator 32. After the microcode completes building the scan table 46 and its associated character tables 48 for a complete page, the microprocessor 24 sends a command to start the character generator 32. The command is received by the interface control circuits 54 (FIG. 2) in which the command is decoded and signals are generated in response to the command to initialize the character generator preparatory to execution of the command.

Figure 11:
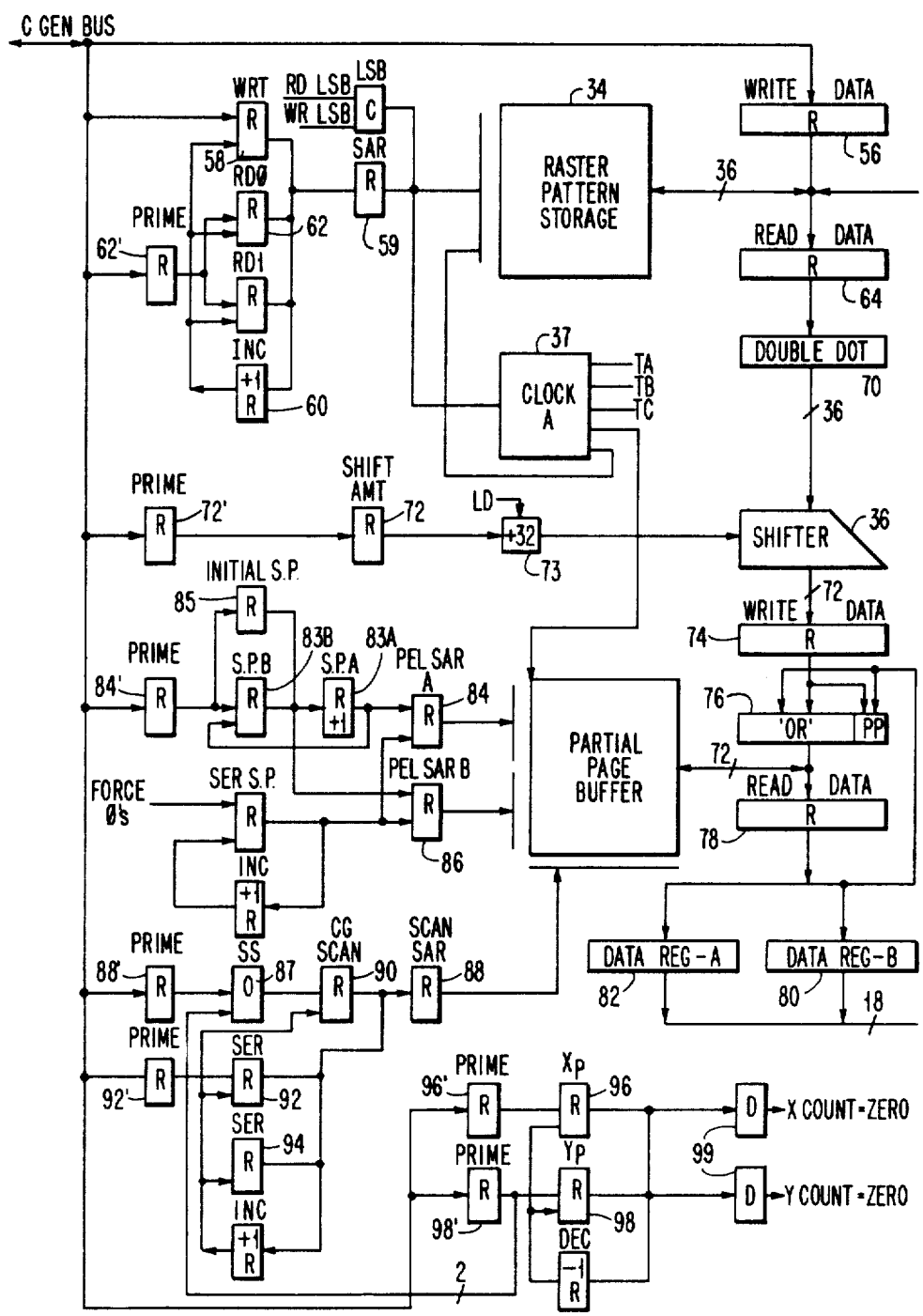
FIG. 11 is a schematic block diagram of the character generator.
Figure 12:
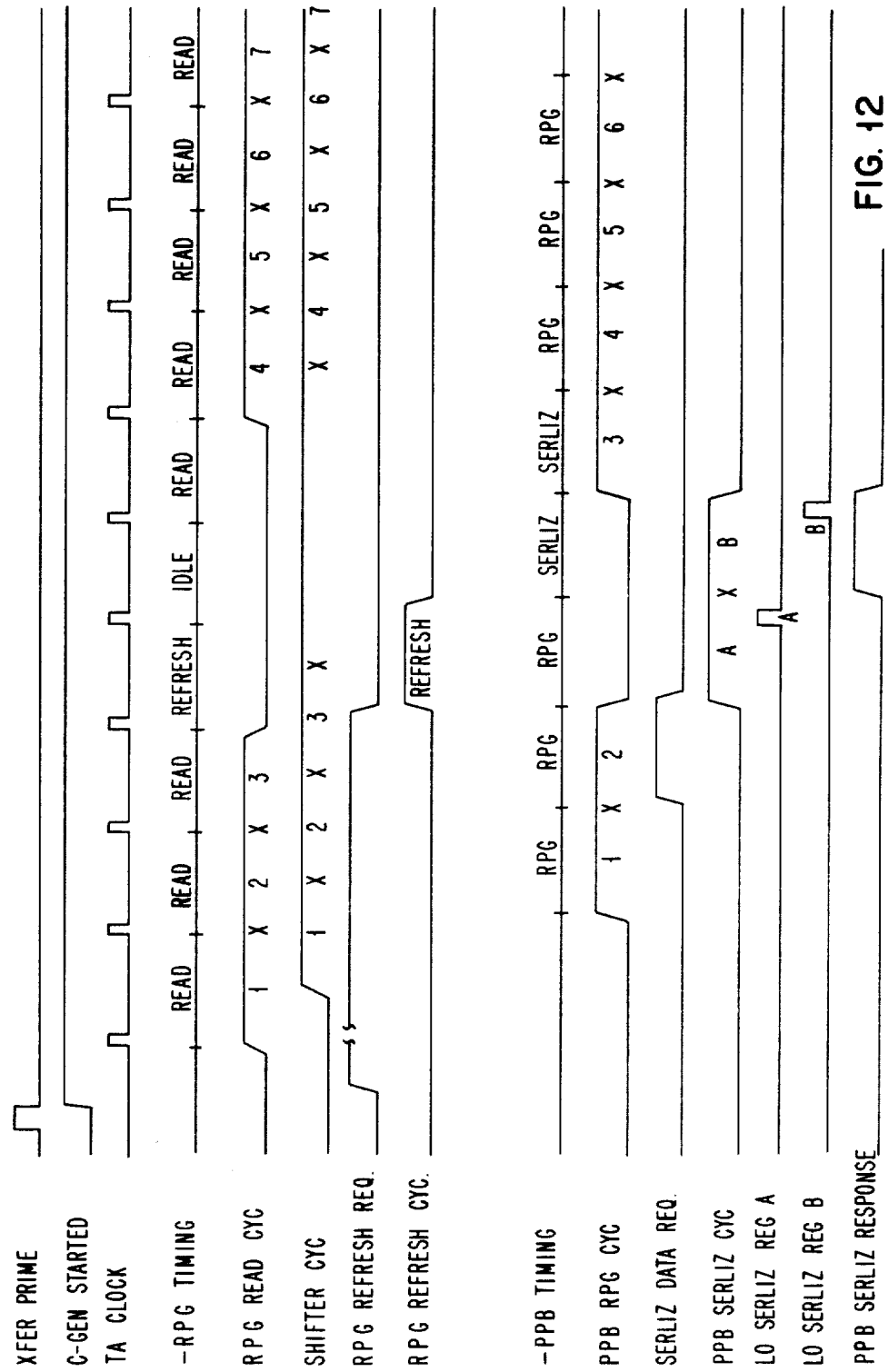
FIG. 12 is a timing diagram showing the relative timing for operation of the components of the character generator.

Raster data that comes from the host is loaded into the RPS 34 via the write data register 56 (FIG. 11) in the Raster Pattern Generator (RPG) 35. The basic timing for the character generator is provided by clock A 37. Clock A 37 provides the timing signals required for the operation of RPS 34 and PPB 38. The write address register 58 and an incrementing loop including incrementor 60 supply the address to storage address register (SAR) 59 for data written to the RPS 34. All the raster data must be loaded prior to execution of the command.

Once the raster data is loaded into the RPS, characters can be read from RPS and loaded into the partial page buffer (PPB) 38 for printing. The read address register 62 and an incrementing loop provide the address for data read from RPS 34. Data read from RPS is loaded into the read data register 64. Data from the extended graphics feature 40 is also loaded into this data register 64 when processing a Kanji character. Image data can be loaded into this register from the compressed Image Buffer 42 over bus 45.

The data in the RPG read data register 64 contains information for only one scan or portion of a scan of a raster pattern. The RPG read data register 64, as well as the RPG write data register 56, are 4 bytes wide. Patterns wider than 4 bytes require two or more read cycles from RPS 34 to complete one scan of the pattern. The read address register 62 and the double dot gating mechanism 70 are used for printing half-resolution images.

Data from the RPG read data register 64 is steered through the double dot gating mechanism 70 to the shifter 36 where data is aligned on the correct pel or bit in the PPB 38. Since all read and write cycles in the PPB access 8 bytes, the 4 bytes of RPG data must be shifted to the proper position within the 8 bytes before it is written to the PPB 38. The shift amount is determined from the lower six bits of the C GEN starting pel value in the character table entry and is stored in the "shift AMT" register 72.

Shifted data from the shifter 36 is loaded in the PPB write data register 74. The PPB storage is a high speed static random access storage device. Every cycle to the PPB is a read-modify-write cycle. Data from the RPG is ORed by OR circuit 76 with the data already stored at a PPB location and the result written back to the PPB. The data read from the PPB is loaded into the read data register 78 and can subsequently be loaded into the serializer data register B 80 or the serializer data register A 82 when the PPB cycle taken was a result of a request for data from the serializer. The data taken from the PPB is read out in the same read-modify-write cycle as described above. However, when the data is written back, all zeros are written so that location in PPB is ready to receive new print data.

The predetermined group of scan lines in a specific embodiment is four. For this embodiment, the low order two bits of the starting scan field comprises the sub scan field. These two low order bits in the Starting Scan Register Prime 88' are always zero. The individual character table formats have 2 sub scan bits in the high order position of the size field. These bits are transferred from Scan Height Prime Register 98' to OR circuit 87. These sub scan bits are ORed with the starting scan prime value and loaded into the starting scan working register 90 during a TRANSFER PRIME. The format sub scan bits specify which of the four scan lines upon which the pattern is to start.

Independently controlled pel storage address registers (pelsar) 84, 86 for C GEN or serializer accesses to the PPB are provided. The pelsars provide a "horizontal" address of 8 bytes of data in the PPB. The serializer pelsar 86 and C GEN pelsar 84 are incremented independently through the two separate incrementing loops.

The scan SAR 88 provides a "vertical" location of 8 bytes of data in the PPB. Independently controlled scan SARs are provided for the RPG 90 (C GEN) serializer A beam 92 and serializer B beam 94.

Xp register 96 and Yp register 98 are used to control pattern width and height, respectively. When both values have been decremented to zero via the decrementing loop as sensed by detectors 99, the end of a pattern processed is signalled.

A "prime" register is provided for the RPS read address 62', the shift amount 72', the C GEN starting pel 84', the RPG scan SAR 88', the Xp counter 96', and the Yp counter 98'. The values must be loaded prior to starting the C GEN and prior to starting the processing of a new character if the value has changed. A prime register 92' for the serializer starting scan must also be loaded prior to starting the serializer.

The character generator components and operation has been described, so an example will be given of the use and accessing of the Format data previously described.

Figure 13:
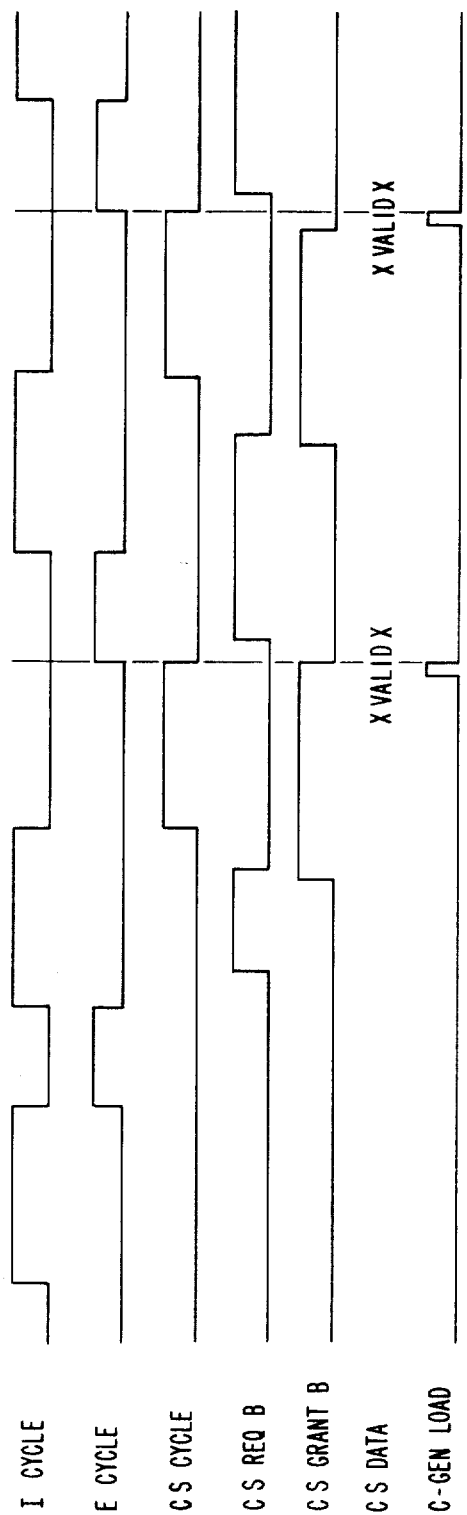
FIG. 13 is a timing diagram showing the timing between the microprocessor and the character generator.
Figure 15:
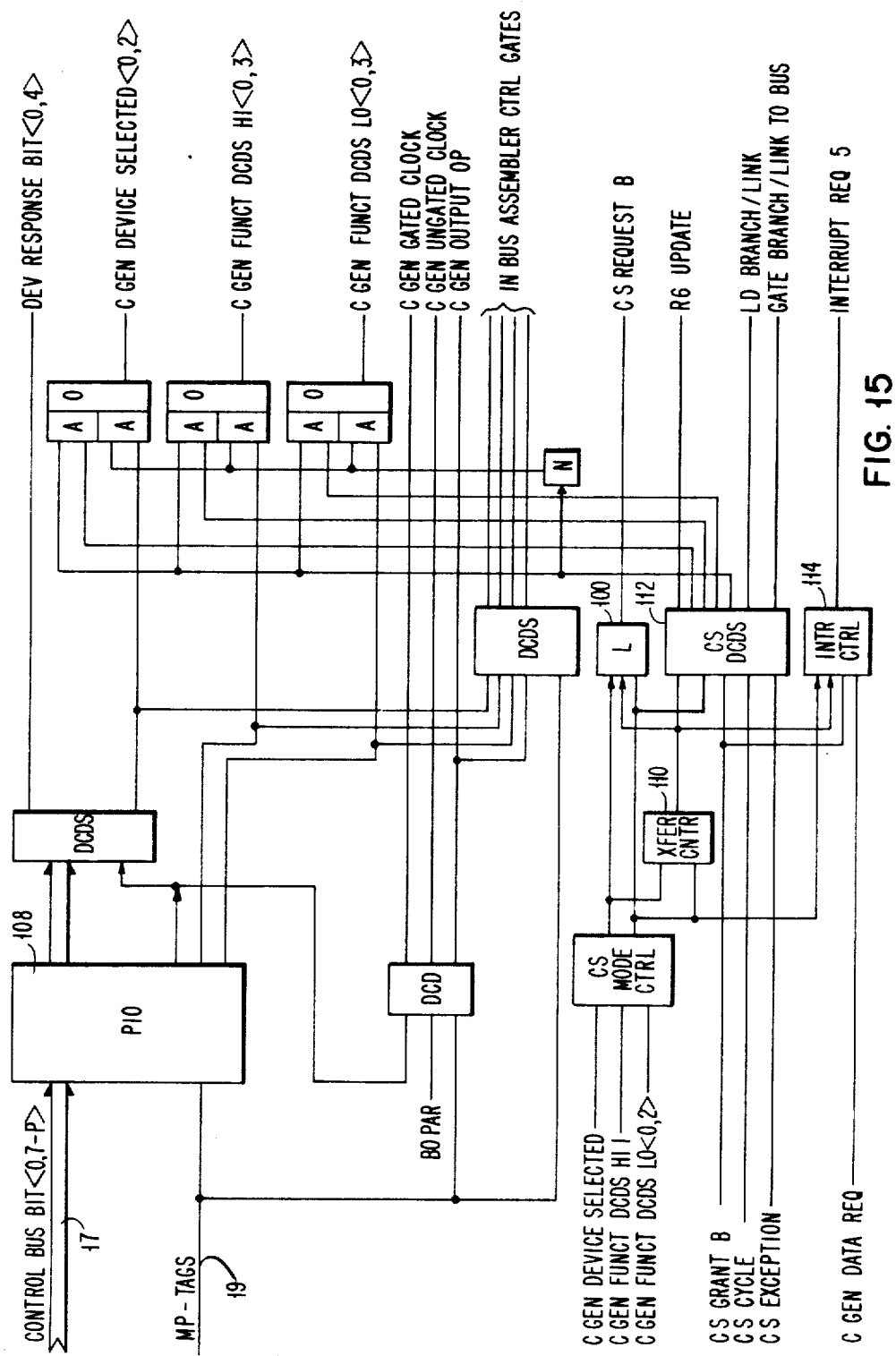
FIG. 15 is a schematic block diagram of the interface control circuits for the character generator.
Figure 16:
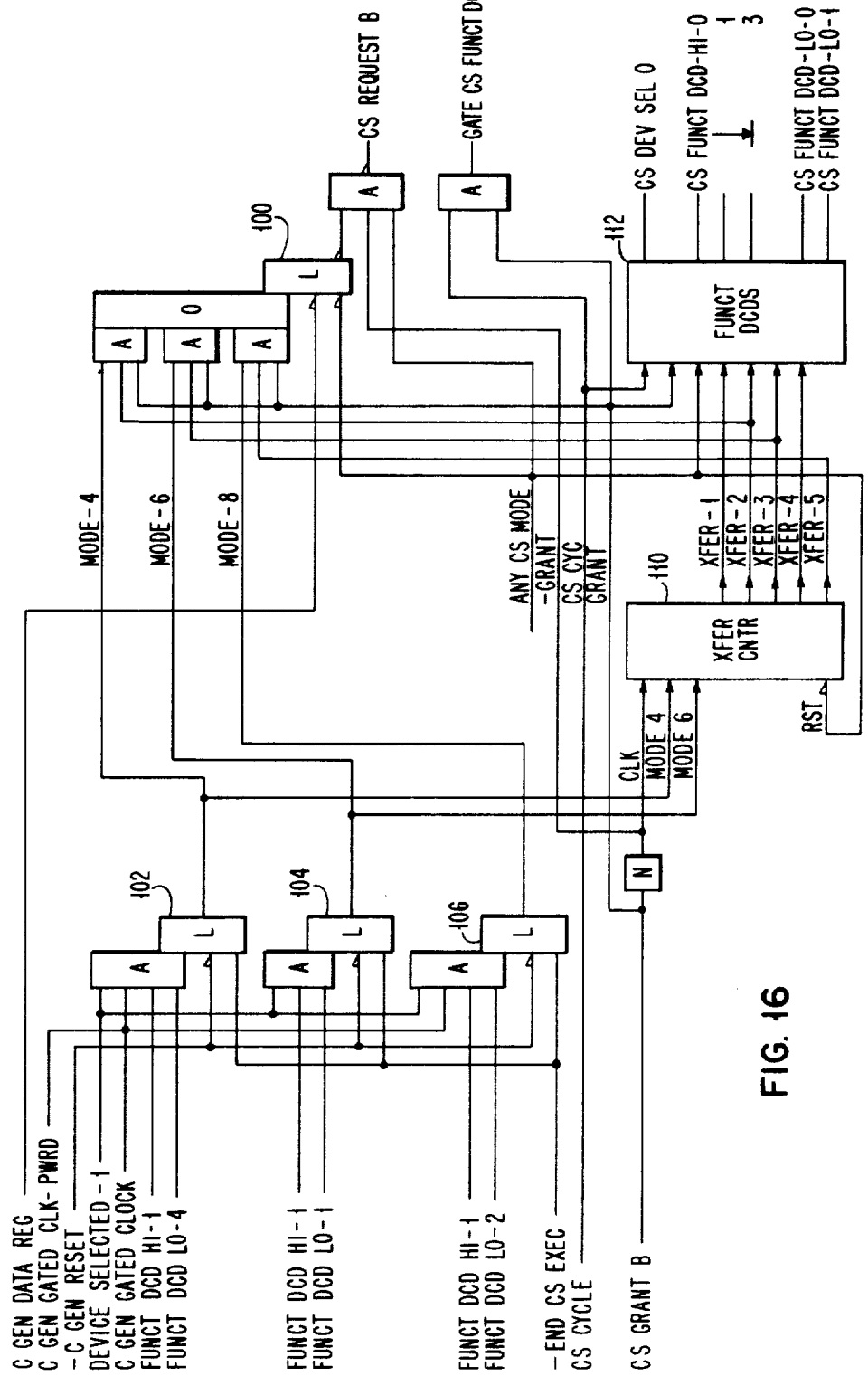
FIG. 16 is a schematic block diagram of the cycle steal execution circuits.
Figure 17:
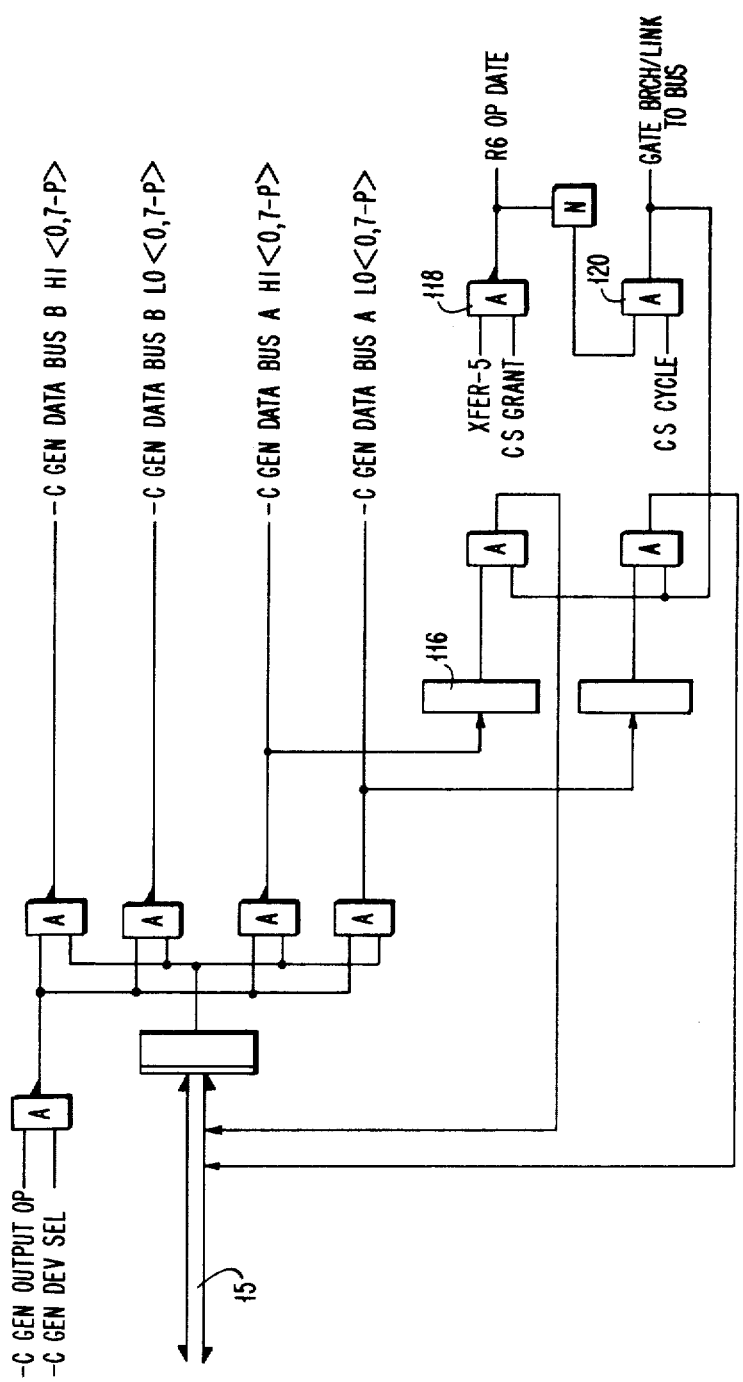
FIG. 17 is a schematic block diagram of the native channel-character generator interface.

As a first example, a Category I operation will be described. In this format, the scan table includes the header information as shown in FIGS. 5 and 6 and Table 1 and the 4, 6 or 8 bytes of format data are included in the character table. The header information is accessed in response to two Program I/O (PIO) instructions from the microprocessor. The data from microprocessor 24 is sent to the character generator 32 over native channel 12. Native channel 12 includes a two byte data bus 15, a one byte control bus 17, and tag line 19. The two byte field containing the starting scan is loaded into the character generator scan prime register 88'. The starting location of data (char tables) in WCS is loaded into the cycle steal address register in the microprocessor by means of a second PIO instruction. A fourth PIO instruction is sent to the C GEN to set the appropriate CS mode latch 102, 104 or 106 depending on whether a 4, 6 or 8 byte cycle steal format is to be used. The PIO instruction is coupled over native channel 12 to PIO DECODE 108. The appropriate ones of the decode signals are then coupled to set the appropriate mode latch. The decoded signals (from PIO Decode 108 (FIG. 15)) in response to the PIO instruction causes the cycle steal Run Latch 100 to be set to develop the signal CS REQUEST B which is sent to the microprocessor. The microprocessor sends back the signals CS GRANT B and CS CYCLE in response to the request within the timing shown in FIG. 13. The CS CYCLE comes up at the end of the next I-cycle after CS GRANT comes up. For purposes of example, assume that a 6 byte cycle steal format is called for so that latch 104 is set.

Figure 14:
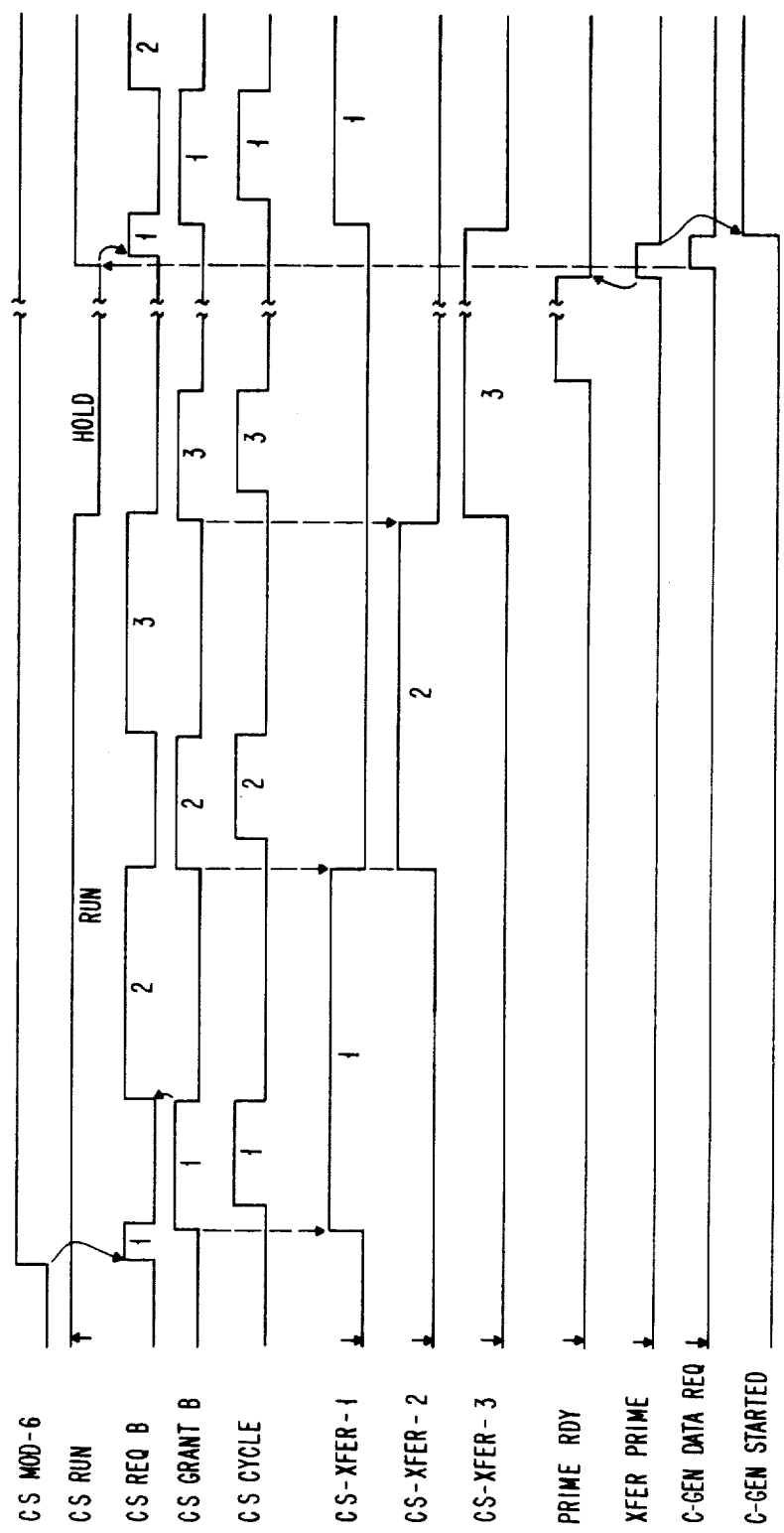
FIG. 14 is a timing diagram showing the relative timing for character generator execution.

Cycle steal transfer counter 110 is reset to the XFER 5 output position at the start of the cycle steal operation. A first cycle steal cycle is executed to read out the first two bytes from WCS 18. The first four-bit field (FORMAT) is used by the Execution Control Circuits 55 to define the functions to be performed for the specified format. In response to gating signals developed in response to cycle steal transfer, the two bytes of the Starting Pel field are loaded into the C GEN S.P. prime register 84' and the lower one byte of this field is loaded into the Shift Prime register 72'. Once the transfer of the first two bytes is completed (see FIG. 14), the signal CS CYCLE goes down and this permits CS REQUEST B to come up to request another cycle steal. Note that the CS XFER CNTR 110 is incremented when the CS GRANT B signal went up, the counter was incremented (end around) to the XFER-1 output to identify the first two byte transfer of data. The signals CS GRANT B and CS CYCLE again come up and the Cycle Steal Address Register, which was incremented on the previous cycle, it now points to the next two bytes to be read out from WCS. The XFER-2 output from counter 110 is coupled to Function Decode circuits 112 so that gating signals are produced to transfer the next two bytes to the Yp PRIME Register 98' and the Xp PRIME Register 96'. The first bit of the low byte is also sent to the Execution Control Logic. After this transfer is complete, another cycle steal is generated as before, and the count in counter 110 is incremented to produce the XFER-3 output. This output causes the CS Run Latch 100 to be turned OFF and put into a hold mode until a C GEN DATA REQUEST signal following an XFER PRIME signal occurs.

The next cycle steal cycle accesses the next two bytes from WCS which define the starting address in RPS 34 where the raster image of the pattern is stored. This address is calculated by the microprocessor when bulding the character tables by referring to the Font Index Table which defines the location of all fonts stored in RPS 34. The RPS Address data is loaded into RPG Read Data Address Prime register 62'. This load is the last event required before the Character Generator 32 can start processing the pattern data. At this time, a signal TRANSFER PRIME is generated by the Execution Control Logic. If the Character Generator is not BUSY at that time, the data from all Prime Registers is transferred broadside to the corresponding working registers. Should the C GEN be BUSY, then there is a wait until the C GEN enters the not BUSY state. Once the TRANSFER PRIME signal comes up, the C GEN starts character execution which will be described below. The C GEN also issues a C GEN DATA REQUEST which causes the CS RUN Latch 100 to be turned back ON to initiate the same series of events for cycle steal fetching of the format data for the next pattern.

This operation continues through all patterns in the Character Table until all are processed. As shown in FIG. 6, the last Character Table entry is a terminator. The terminator is an embedded control which is sensed by the Execution Control Circuits. In response to sensing the terminator, the signal END CS EXEC comes up which indicates that processing of that Character Table is finished. This signal END CS EXEC resets all the mode latches 102, 104 and 106, and causes the Transfer Counter 110 to be reset to a 5-count. The signal also blocks any more Cycle Steal Requests from going out. The signal is also coupled to Interrupt Control 114 to generate the signal INTERRUPT REQ 5 which is sent to the microprocessor 24 to indicate that the C GEN needs further direction.

The four-byte mode as shown in FIG. 5 is similar to the six-byte mode operation just described. However, there is one difference in the fonts that are accessed with the four-byte format, and that is that the size of all the characters remains constant. With this known, the size information need only be given as part of the header information or at the start of every page. The first two bytes of header information are accessed by the use of PIO instructions as described before, and the starting scan data is stored in the Character Generator Scan Prime Register 88'. The starting location of data (char tables) in WCS is loaded by another PIO instruction. The second two byte field of the header information is also accessed by PIO instructions and the size information is stored in the Yp Prime Register 98' and to the Xp Prime Register 96'. The cycle steal address register R6 in the microprocessor is initialized to the starting address of the character table. The mode latch 102 is set via a PIO command to initiate a four-byte cycle steal mode and the first two byte transfer is accessed as described above. The appropriate bits from the STARTING PEL field are gated to the C GEN S.P. Prime Register 84' and to the Shift Amount Prime Register 72'. The second two-byte transfer is accessed so that the RPS address data can be loaded into RPG Read Data Address Prime Register 62'. This completes the loading of data relative to that pattern, the character generator will now start processing the raster data related to the pattern. The terminator entry, which is two bytes long, is utilized at the end of the character table as before to signal the end of the pattern data for that character table.

The eight byte mode as shown in FIG. 7 is utilized to process data to be printed in a Y format. The Format uses no header information, and the information contained in the first three transfers of two bytes. Each are the same as described above with reference to the six-byte mode. However, the fourth transfer contains a BRANCH/LINK Address Field which defines the link to the next character table entry to be accessed. The BRANCH/LINK Address Data is loaded into Branch/Link Address Register 116 and held there. Another cycle steal request is then made which is the fifth request within this series. When CS GRANT comes up, Transfer Counter 110 is incremented to produce the output XFER-5. These two signals condition AND circuit 118 to produce the cycle steal tag signal R6 UPDATE. This signal, along with the signal CS CYCLE, are inputs to AND circuit 120. The output of AND circuit 120 is the signal GATE BRANCH/LINK TO BUS. During this fifth cycle steal, data in the Branch/Link Address Register 116 is gated out over the native channel 12 and back to the microprocessor. The cycle steal memory cycle is taken in the microprocessor, but the memory remains unchanged. Instead, in response to the cycle steal tag signal, the contents of the Branch/Link Address Register 116 is gated into Register R6 in the microprocessor (the cycle steal address register in the microprocessor for the character generator). This will now set up the next cycle steal to access the data at this new address in the character table rather than from the next sequential address in the table. The characters are processed in a nonsequential manner, so far as addresses are concerned, but are accessed in the proper sequence for printing in response to the Branch/Link Address included in the table. No terminator is used in this character table. The terminator used in this character table is provided by assigning a Branch/Link Address to the last character to be executed which will access a storage location known to contain all zeros. Therefore, at the start of the next cycle steal cycle for conditions of the first transfer (XFER-1) and zeros in the high order three bits, a terminator is sensed and the 8 byte mode is ended.

The Serializer Scan Prime Register is set with a PIO instruction from the microprocessor which initializes the location for the starting point of the page to be printed. The serializer is started by the microcode and initiates a data request to the C GEN for data to be printed. The PPB 38 accepts the data request and initiates two back-to-back PPB/serializer cycles. The PPB executes a read-modify-write cycle and loads the read data into Serializer Data Register A (8 bytes) and writes back all zeros. The second cycle repeats the same operation except that data is loaded to Serializer Data Register B (8 bytes). The C GEN will acknowledge to the serializer that the data registers have been loaded. The serializer will then proceed to gate the data to the parallel to serial circuits for transmission to the laser for printing.

Figure 10:
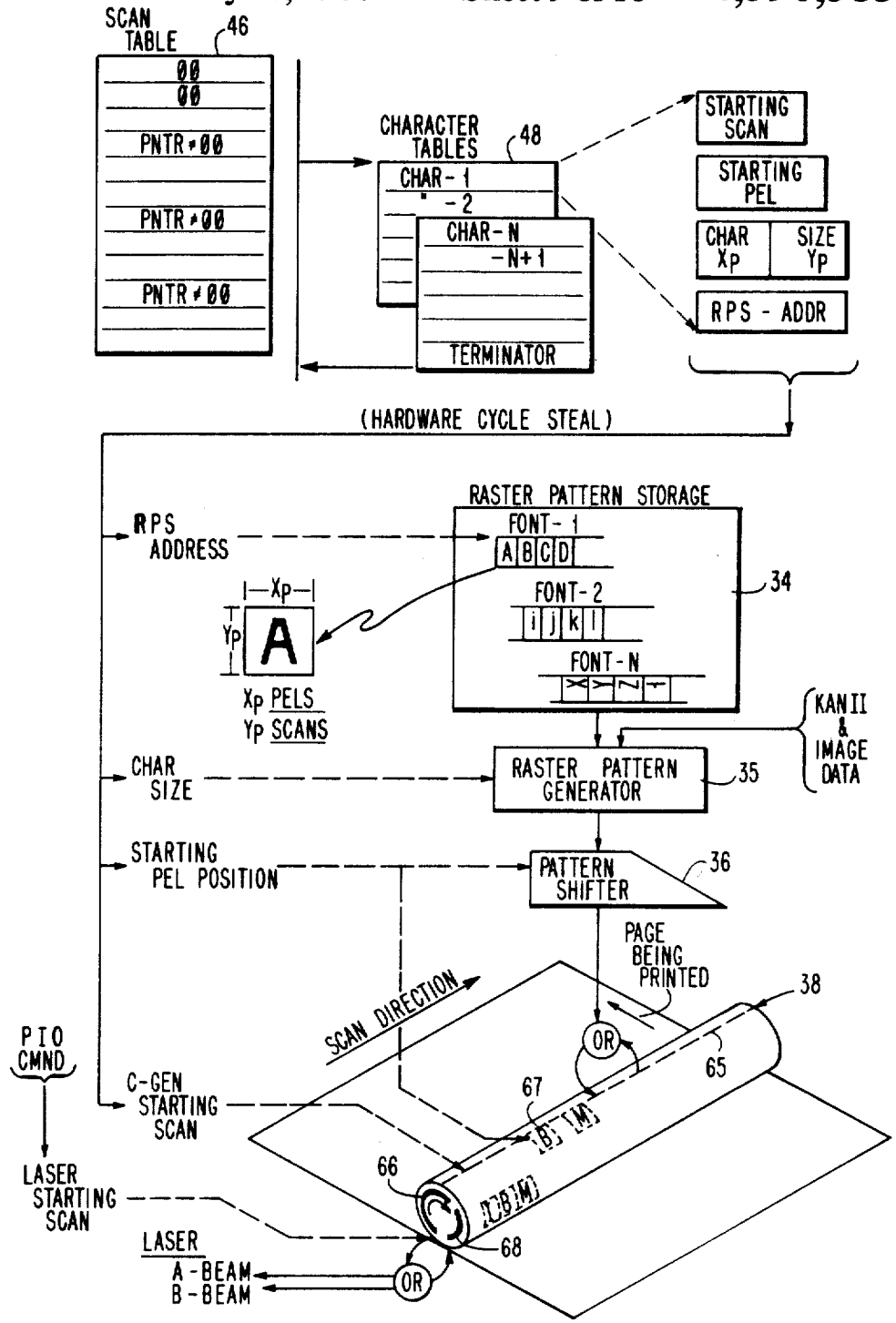
FIG. 10 is a diagram showing a conceptual operation of the manner in which a page is printed utilizing the character generator according to the invention.

The raster image to be printed is assembled in the PPB 38. The PPB covers only a small part of the page to be printed which, in a specific embodiment, was chosen to be 128 scan lines. Depending on the resolution, this PPB capacity would normally provide data for printing only a fraction of an inch on the page. A conceptual diagram is shown in FIG. 10 which illustrates how the PPB 38 can be operated to print a page. The partial page buffer 38 is shown as a cylinder in which scan line 127 wraps back to scan line zero. The printing takes place from those scan lines 68 filled and ready for printing as the PPB 38 "rolls across the plane" of the page being printed. The data on the scan line at the contact point is sent to the print head serializer. As each scan line is printed, the cylinder, in effect, rolls one scan line position. Since each scan line in the PPB is used several times during the printing of a page, data for that poisiton in the scan line is set to zero after transfer to the serializer. The entire raster patterns, such as the character B 67, are loaded into the scan lines 66 that have been cleared after printing. The loading process begins at the current starting scan line 65 and moves into the cleared area 66 toward the place where data is being sent to the serializer. The current starting scan line 65 is prevented from moving closer than 64 scan lines from the printing scan so that the largest raster patten that can be loaded without interfering with the printing process is 64. The raster pattern can extend across the entire page if desired. If the distribution of the raster data to be printed on the page causes the starting scan to move into the 64 scan line area, loading of the PPB must wait for the printer to finish with enough scan lines so that the 64 scan line work area is preserved.

During execution by the Character Generator of the format data received from the microprocessor, an RPS storage cycle is taken and the raster data is read out to the RPG Read Date Register 64. The data is coupled directly through double dot means 70 if no double dotting is required to the shifter 36. The 32 bits of data is positioned within the 64 bit output field of the shifter by means of the shift amount stored in register 72 and stored in PPB Write Data Register 74.

The data is then stored in PPB 38 at the location defined by the contents of C GEN SCAN and Pel SAR Address Registers. The PPB, in the specific embodiment shown, comprises two sections A and B each 8K by 4 bytes. Section A is addressed by pel SAR A 84 and Section B is addressed by pel SAR B86. To insure that the raster pattern data is stored in the proper position in PPB 38, the addressing circuits are designed to properly store the raster data in PPB regardless of the shift amount. The starting pel field is divided so that the low order 6 bits 10–15 are stored in Shift Amount Register 72. The high order bit 10 of this group, the 32 bit, is loaded into the +32 register 73. The entire two byte starting pel field is loaded into Starting Pel Register prime 84'. A word comprising bits 3–10 of the starting pel field is gated into starting pel B working register 83B and starting pel initial register 85. Note that bit 10, the 32 bit is the low order bit in these register. The address for starting pel A working register 83A is the address in starting pel B working register 83B incremented by one. The address gated to pel SAR A and pel SAR B are the contents of starting pel B working register and starting pel B working register minus the low order bit. This has the effect of incrementing the respective A or B address only on alternate accesses. The order of the accesses is determined by the "32 bit" which determines whether the shift amount is equal to or less than 32 or greater than 32. By "toggling" the addresses in this manner, the respective 32 data bits (4 bytes) within the eight byte output of shifter 36 are properly positioned within PPB 38 relative to the contiguous 32 data bits to be processed next. The data is written into PPB 38 in a Read-Modify-Write cycle. In the Read part of the cycle, the addressed data is read from the addressed location to Read SDR Register 78 gated back around to the PPB along line 79 to OR circuits 76.

In the modify part of the cycle, the read data is logically ORed with the new data from the Write SDR Register 74, and, for the write part of the cycle, the modified (ORed) data is written back into the addressed location. This operation is continued until the count in Xp Count Register and the Yp Count Registers are zero which indicates that the data for one pattern has been stored in the PPB.

While the invention has been particularly shown and described with reference to a preferred embodiment thereof, it will be understood by those skilled in the art that various changes in the form and details may be made therein without departing from the spirit and scope of the invention.

Having thus described our invention, what we claim as new and desire to secure by Letters Patent is:

1. A character generator for a printing system for printing text and image patterns on a print medium in raster fashion in successive scan lines in response to input data comprising:

a character generator bus structure to provide a conductive path to transmit data signals and control signals within said character generator;

pattern storage means for storing raster pattern data for each of the text and image patterns, said pattern storage means coupled to said bus structure;

input means for assembling patterns forming a page to be printed on a print medium in a raster pattern in a plurality of successive scan lines, said input means including means for generating format data for each pattern and means for storing said format data, said format data comprising format position data for specifying the position of the pattern on the page, format size data for specifying the size of the pattern, and format location data for specifying the location of the pattern in said pattern storage means, said input means being coupled to transmit data signals and control signals to said bus structure;

means for accessing, from said input means, said format data to identify those patterns beginning within a predetermined group of said scan lines;

output buffer means for storing output raster pattern data for presentation in sequence to an output device for controlling the printing of the pattern defined by said output raster pattern data, said output buffer means being coupled to said bus structure;

first control means operable in response to said format location data to read out said raster pattern data from said pattern storage means;

second control means operable in response to said format position data and said format size data to store said raster pattern data, that was read out from said pattern storage means, into said output buffer means in the size and position defined by said format data; and third control means for accessing said output raster pattern data stored in said output buffer means in the sequence required for printing by an output means so that a printed pattern corresponding to each of the patterns defined by said format data can be printed on said print medium.

2. The character generator of claim 1 additionally comprising:

first register means comprising a plurality of registers for loading each component of said format data in one of said registers of said first register means;

second register means coupled to said first register means;

means for generating a control signal indicating that the registers comprising said first register means are loaded with format data for a first pattern;

means responsive to said control signal to transfer the contents of said first register means to said second register means; and means to load format data into said first register means for a second pattern while the format data in said second register means is used to access raster data for said first pattern.

3. The character generator of claim 2 wherein said means for loading said first register means comprises loading said format data by means of a cycle steal transfer.

4. The character generator of claim 1 wherein said format size data is specified as a height in scan lines and a width in pels; and means for accessing said raster pattern data for a specified pattern and for storing the raster pattern data into said output buffer means for the specified height and width prior to accessing a second pattern.

5. The character generator of claim 1 wherein one out of said predetermined group of scan lines is specified by a sub scan field in said size format data; and means for setting the starting scan to the specified one of said group of scan lines for each pattern accessed.

6. The character generator of claim 1 wherein said output buffer means has capacity for storing only a fraction of the raster pattern data required to print a page and wherein said means for storing raster pattern data into said output buffer means and said means for accessing raster pattern data in said output buffer means for printing operate concurrently so that said storing and said accessing permits printing of an entire page of the raster patterns on a real time basis.

7. The character generator of claim 1 wherein said means for reading data into said output buffer means additionally comprises:

sequencing means for reading data into said output buffer means in a read-modify-write cycle so that said raster pattern data is logically ORed with data previously stored in said output buffer means.

8. The character generator of claim 1 wherein a branch/link address to the next pattern is included within said format data.

9. The character generator of claim 8 additionally comprising means to store said branch/link address to serve as a cycle steal address for the next pattern to be processed.

10. In a printer system for producing text and image patterns on a print medium in raster fashion in successive scan lines in response to input data comprising:

character generator bus structure to provide a conductive path to transmit data signals and control signals within said character generator;

pattern storage means for storing raster pattern data for each of the text and image patterns, said pattern storage means coupled to said bus structure;

input means for assembling patterns forming a page to be printed on a print medium in a raster pattern in a plurality of successive scan lines, said input means including means for generating format data for each pattern and means for storing said format data, said format data comprising format position data for specifying the position of the pattern on the page, format size data for specifying the size of the pattern, and format location data for specifying the location of the pattern in said pattern storage means, said input means being coupled to transmit data signals and control signals to said bus structure;

means for assembling the format data for all patterns beginning within a predetermined group of scan lines;

means for accessing the format data for each of said patterns within said assembled format data;

output buffer means for storing output raster pattern data for presentation to an imaging apparatus for controlling the printing of the pattern defined by the stored output raster pattern data;

means operable in response to said format position data for accessing the raster pattern data for the specified pattern from said pattern storage means;

means operable in response to said size format data and said position format data to load said accessed raster pattern data into said output buffer means in the sequence, size and position specified by said format data;

means to access said output raster pattern data stored in said output buffer means in the order required for printing;

imaging means; and means for coupling said output raster pattern data to said imaging means to print the pattern defined by said input data on a print medium.

11. The system of claim 10 additionally comprising:

first register means comprising a plurality of registers for loading each component of said format data in one of said registers of first register means;

second register means coupled to said first register means;

means for generating a control signal indicating that the registers comprising said first register means are loaded with format data for a first pattern;

means responsive to said control signal to transfer the contents of said first register means to said second register means; and means to load format data into said first register means for a second pattern while the format data in said second register means is used to access raster data for said first pattern.

12. The system of claim 11 wherein said means for loading said first register means comprises loading said format data by means of a cycle steal transfer.

13. The system of claim 1 wherein said format size data is specified as a height in scan lines and a width in pels; and means for accessing said raster pattern data for a specified pattern and for storing the raster pattern data into said output buffer means for the specified height and width prior to accessing a second pattern.

14. The system of claim 1 wherein one out of said predetermined group of scan lines is specified by a sub scan field in said size format data; and means for setting the starting scan to the specified one of said group of scan lines for each pattern accessed.

15. The system of claim 1 wherein said output buffer means has capacity for storing only a fraction of the raster pattern data required to print a page and wherein said means for storing raster pattern data into said output buffer means and said means for accessing raster pattern data in said output buffer means for printing operate concurrently so that said storing and said accessing permits printing of an entire page of the raster patterns on a real time basis.

16. The system of claim 1 wherein said means for reading data into said output buffer means additionally comprises:

sequencing means for reading data into said output buffer means in a read-modify-write cycle so that said raster pattern data is logically ORed with data previously stored in said output buffer means.

17. The system of claim 1 wherein a branch/link address to the next pattern is included within said format data.

18. The system of claim 17 additionally comprising means to store said branch/link address to serve as a cycle steal address for the next pattern to be processed.

* * * * *